(12) United States Patent
Drabon et al.

(10) Patent No.: US 9,370,980 B2
(45) Date of Patent: Jun. 21, 2016

(54) LEAF SPRING ARRANGEMENT

(71) Applicant: Benteler Automobiltechnik GmbH, Paderborn (DE)

(72) Inventors: Rodscha Drabon, Salzkotten (DE); Christian Smatloch, Paderborn (DE); Jürgen Von der Kall, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/613,076

(22) Filed: Feb. 3, 2015

(65) Prior Publication Data

US 2015/0217615 A1   Aug. 6, 2015

(30) Foreign Application Priority Data

Feb. 5, 2014   (DE) .......................... 10 2014 101 429

(51) Int. Cl.
| | |
|---|---|
| *B60G 11/08* | (2006.01) |
| *B60G 11/12* | (2006.01) |
| *B60G 11/10* | (2006.01) |
| *F16F 1/368* | (2006.01) |

(52) U.S. Cl.
CPC ............... *B60G 11/08* (2013.01); *B60G 11/10* (2013.01); *B60G 11/12* (2013.01); *F16F 1/3686* (2013.01); *B60G 2202/114* (2013.01); *B60G 2204/121* (2013.01); *B60G 2204/43* (2013.01); *B60G 2204/44* (2013.01); *B60G 2206/428* (2013.01); *B60G 2206/7101* (2013.01); *B60G 2206/72* (2013.01); *B60G 2206/821* (2013.01)

(58) Field of Classification Search
CPC ....... F16F 1/3686; B60G 11/08; B60G 11/12; B60G 11/10; B60G 2206/821; B60G 2204/121; B60G 2204/114
USPC .................................. 267/260; 280/124.175
See application file for complete search history.

(56) References Cited

U.S. PATENT DOCUMENTS

| | | | | |
|---|---|---|---|---|
| 3,586,307 A | * | 6/1971 | Brownyer | B60G 11/10 267/47 |
| 4,707,317 A | | 11/1987 | Epel | |
| 4,762,307 A | * | 8/1988 | Woltron | B29C 70/86 267/158 |

(Continued)

FOREIGN PATENT DOCUMENTS

| | | |
|---|---|---|
| DE | 36 13 804 | 7/1987 |
| DE | 695 10 407 | 1/2000 |

(Continued)

OTHER PUBLICATIONS

European Search Report issued on May 26, 2015 in counterpart European Patent Application No. EP 15 15 3778.

(Continued)

*Primary Examiner* — Ruth Ilan
(74) *Attorney, Agent, or Firm* — Henry M. Feiereisen LLC

(57) ABSTRACT

A leaf spring arrangement for a motor vehicle axle includes a leaf spring which is made of a fiber composite and has ends, each end having a flat underside to provide a joining surface. Bonded flatly by an adhesive against the underside of each end of the leaf spring in an area of the joining surface is a mount for attachment onto a further axle component. The mount has an opening for receiving a metallic bearing or screw bolt.

10 Claims, 3 Drawing Sheets

(56) References Cited

U.S. PATENT DOCUMENTS

| | | | | |
|---|---|---|---|---|
| 4,771,997 | A * | 9/1988 | Haldenwanger | F16F 1/3686 267/149 |
| 4,869,472 | A * | 9/1989 | de Goncourt | F16F 1/3686 267/160 |
| 4,886,254 | A * | 12/1989 | Carpentier | B29C 70/86 267/148 |
| 6,029,987 | A * | 2/2000 | Hoffman | B60G 11/10 267/260 |
| 6,361,032 | B1 | 3/2002 | Lawson | |
| 2003/0122339 | A1 | 7/2003 | Drabon et al. | |
| 2005/0173882 | A1 | 8/2005 | Drabon et al. | |
| 2011/0089223 | A1 | 4/2011 | Drabon et al. | |
| 2012/0098229 | A1 | 4/2012 | Hochapfel | |
| 2012/0267835 | A1 | 10/2012 | Drabon et al. | |

FOREIGN PATENT DOCUMENTS

| | | |
|---|---|---|
| DE | 102011055625 | 5/2013 |
| EP | 0 044 191 | 1/1982 |
| EP | 0 092 949 | 11/1983 |
| FR | 2 586 624 | 3/1987 |
| JP | S58-142044 | 8/1983 |
| JP | S60-107431 | 7/1985 |
| JP | S61-119826 | 6/1986 |
| JP | S61-157843 | 7/1986 |
| NL | 8 600 221 | 8/1987 |
| WO | WO 96/27507 | 9/1996 |
| WO | WO 99/47373 | 9/1999 |

OTHER PUBLICATIONS

English translation of European Search Report issued on May 26, 2015 in counterpart European Patent Application No. EP 15 15 3778.

* cited by examiner

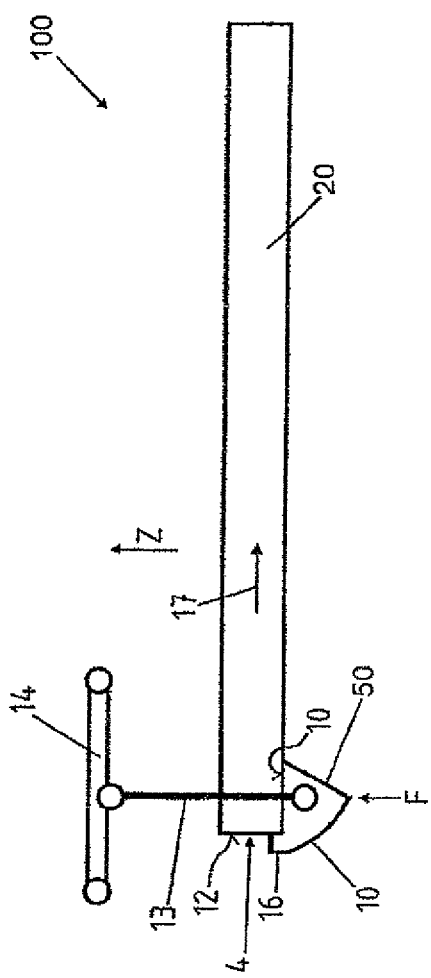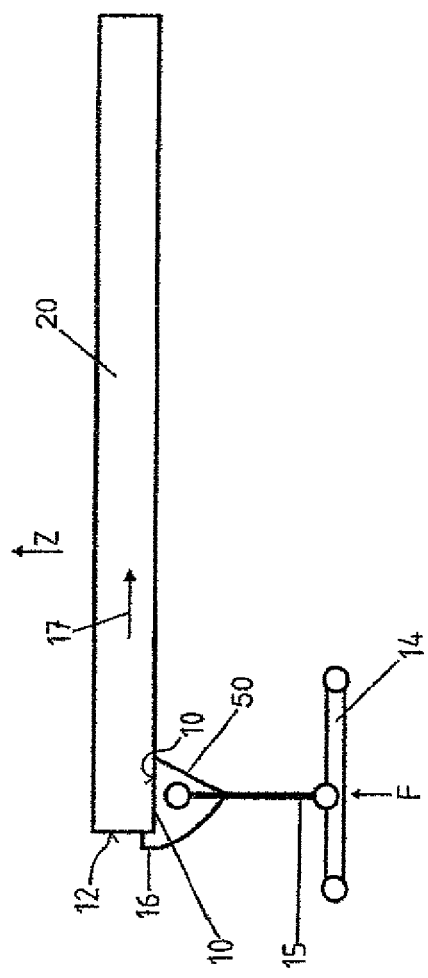

LEAF SPRING ARRANGEMENT

CROSS-REFERENCES TO RELATED APPLICATIONS

This application claims the priority of German Patent Application, Serial No. 10 2014 101 429.4, filed Feb. 5, 2014, pursuant to 35 U.S.C. 119(a)-(d), the disclosure of which is incorporated herein by reference in its entirety as if fully set forth herein.

BACKGROUND OF THE INVENTION

The present invention relates to a leaf spring arrangement for a motor vehicle axle.

The following discussion of related art is provided to assist the reader in understanding the advantages of the invention, and is not to be construed as an admission that this related art is prior art to this invention.

It is known in the art to equip motor vehicles with axle systems so that the wheels of the motor vehicle are resiliently supported. At standstill, static wheel loads act on the motor vehicle and are superimposed during operation of the motor vehicle with dynamic wheel loads.

Different axle concepts are known, for example a suspended rigid axle or independent wheel suspensions, in order to realize the desired suspension of the motor vehicle. In principle, the wheel is acted upon by a suspension and an attenuation to absorb the static and dynamic wheel loads. Mechanical springs are especially used hereby and may be designed, for example, as round wire springs or also as leaf springs. In order for the leaf springs to be coupled with the motor vehicle axle components, e.g. with the motor vehicle control arms, in particular transverse control arms, it is known to provide a leaf spring at each end thereof with a mount which can be threadably engaged, for example, to a respective transverse control arm and which is typically screwed to the end of the leaf spring by a bolt received in a throughbore in the leaf spring.

FIG. 1 shows a conventional leaf spring 1 configured as transverse leaf spring 2. The transverse leaf spring 2 has a midsection 3 and two ends 4. A mount 5 is connected to the each end 4 of the transverse leaf spring by drilling a bore through the end 4 of the transverse leaf spring 2 for passage of a screw bolt 6 so as to couple the end 4 to the mount 5. The midsection 3 is further provided with attachments 7 to connect the transverse leaf spring 2 to a not-shown motor vehicle body or subframe. A mechanical drilling of the transverse leaf spring 2 in this way to realize the connection between the mount 5 and the end 4 of the leaf spring 2 adversely affects the durability and life of the leaf spring.

It would be desirable and advantageous to provide an improved leaf spring arrangement which obviates prior art shortcomings and which has a long-lasting life while yet being producible in a simple and cost-effective way and reliable in operation.

SUMMARY OF THE INVENTION

According to one aspect of the present invention, a leaf spring arrangement for a motor vehicle axle includes a leaf spring made of a fiber composite and having ends, each end having a flat underside to provide a joining surface, and mounts for attachment onto an axle component, the mounts being bonded by an adhesive flatly against the underside of the ends of the leaf spring in an area of the joining surface, each mount having an opening for receiving a metallic bearing or screw bolt.

The present invention resolves prior art problems by applying an adhesive to bond the mount to the end of the leaf spring. Examples of an adhesive include a single-component adhesive or two-component adhesive. Currently preferred is the use of an adhesive that can be thermally activated or an anaerobically curable adhesive. The mount has a flat joining surface which complements the flat joining surface at the end of the leaf spring and is bonded thereto via the adhesive to connect the joining surfaces of leaf spring and mount to one another. The bond at the ends of the leaf spring is effective and allows movements by the suspension and thus any changes in shape of the leaf spring in the inner zone or midsection, while the ends of the leaf spring are able to move in kinematic movement direction but not to move within themselves. Thus, the presence of microcracks, in particular in the bonding zone, is effectively prevented in accordance with the present invention.

According to another advantageous feature of the present invention, the mount may be made of a metallic material. Examples include a steel alloy or light metal alloy.

According to another advantageous feature of the present invention, the leaf spring may be configured as a transverse leaf spring. Currently preferred is the provision of a transverse leaf spring which is made of several layers of a fiber composite. An example of a fiber composite includes a fiberglass composite.

According to another advantageous feature of the present invention, the opening of the mount may extend in substantial orthogonal relation to the joining surface and can be used for receiving a bearing or a bolt to enable connection of the mount with a further axle component, e.g. directly with a transverse control arm or connection to a respective control arm of the wheel suspension via a tie rod or pressure bar.

According to another advantageous feature of the present invention, the flat underside of the ends of the leaf spring may be provided in installation direction. The mount with its joining surface rests flatly against the underside and is bonded thereto by a suitable adhesive.

According to another advantageous feature of the present invention, the mount may be configured to embrace, at least in part, an end face of the leaf spring. Advantageously, an adhesive is applied between the end face of the leaf spring and the mount.

According to another advantageous feature of the present invention, a tie rod or pressure bar may be provided and coupled to the mount to exert a force from the mount in a direction of the end of the leaf spring. The bonding zone in particular is thus acted upon by a compressive force or pressing force such that the presence of a shearing is prevented and any movement to undo the bond between the end of the leaf spring and the mount is avoided.

According to another advantageous feature of the present invention, the mount may include a joining surface and a support shoulder configured to extend beyond the joining surface of the mount with respect to a vertical motor vehicle direction, with the support shoulder resting against the end face of the leaf spring.

According to another advantageous feature of the present invention, the support shoulder may have a contact surface which is bonded with the end face of the leaf spring.

The provision of a bonded joint allows a cost-effective and simple production of the leaf spring. Furthermore, in particular the predominantly transmitting force in pressure direction results in a long durability of the leaf spring arrangement according to the present invention with bonded mount.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3a shows a schematic illustration of a leaf spring arrangement according to the present invention with attachment of a tie rod; and FIG. 3b shows a schematic illustration of a leaf spring arrangement according to the present invention with attachment of a pressure bar.

DETAILED DESCRIPTION OF PREFERRED EMBODIMENTS

Figure 1:
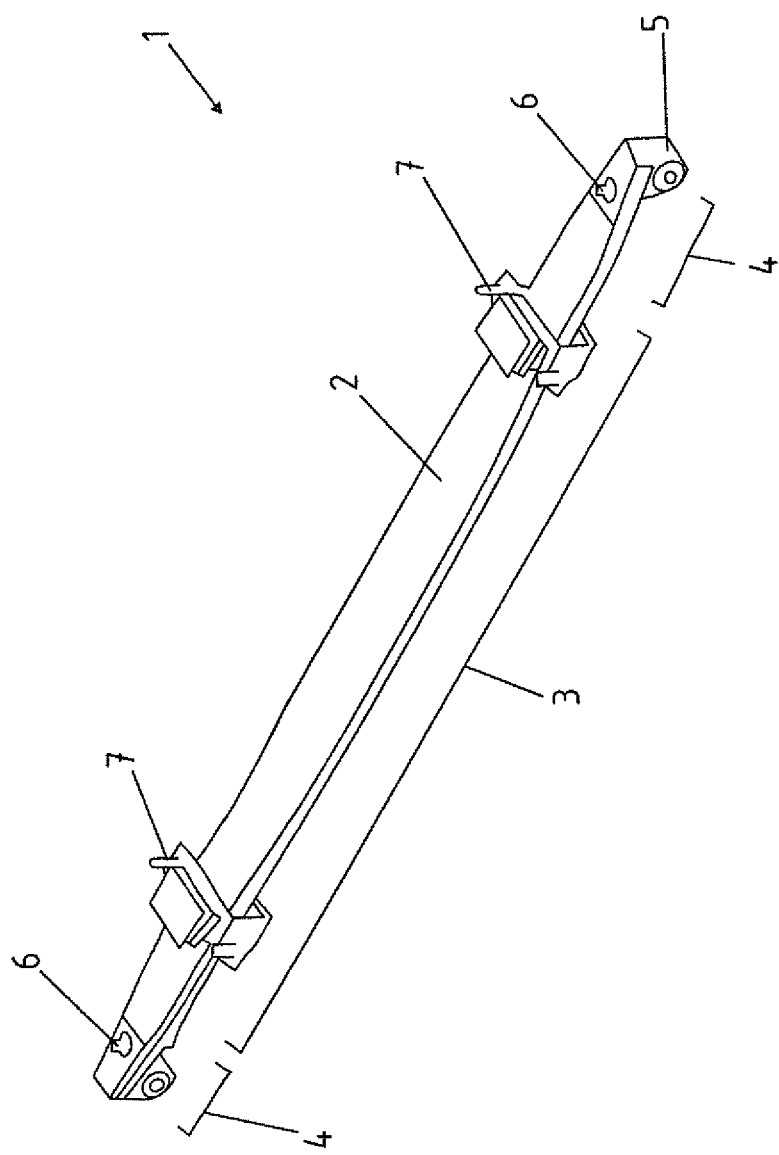
FIG. 1 shows a conventional transverse leaf spring arrangement.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2A:
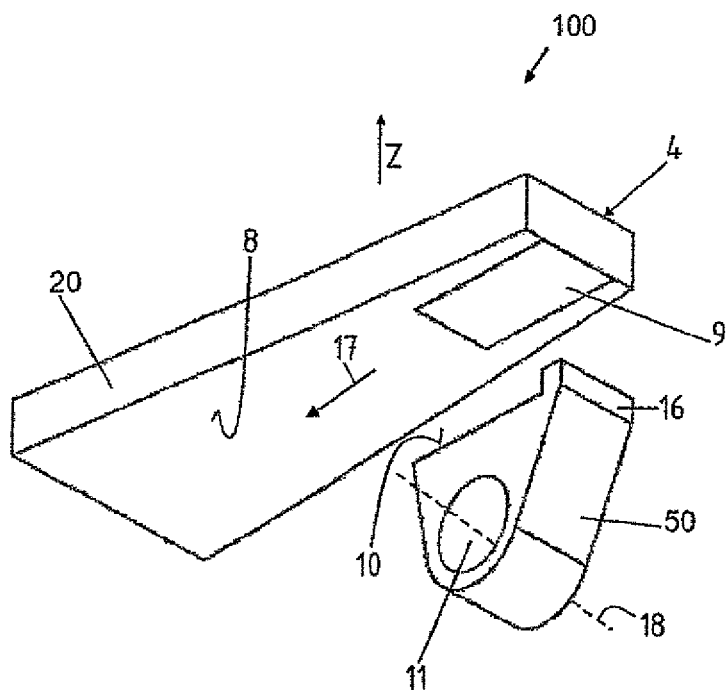
FIG. 2a shows an exploded perspective view of a leaf spring arrangement according to the present invention.
Figure 2B:
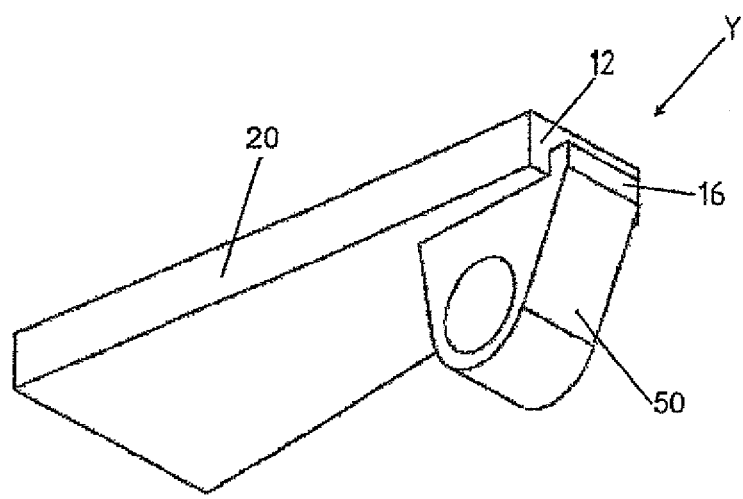
FIG. 2b shows a perspective view of the leaf spring arrangement of FIG. 2a in assembled state.

Turning now to the drawing, and in particular to FIG. 2a, there is shown an exploded perspective view of a leaf spring arrangement 100 according to the present invention. The leaf spring arrangement 100 includes a leaf spring 20 having opposite ends 4. Each end 4 has an underside 8 with a flat joining surface 9 which complements a joining surface 10 of a mount 50. Using an adhesive, the joining surface 10 of the mount 50 is bonded to the joining surface 9, as shown in FIG. 2b. The mount 50 is provided with an opening 11 which is arranged below the joining surface 9, as viewed in motor vehicle Z direction, indicated by an arrow. The opening 11 is defined by a longitudinal axis 18 which extends in orthogonal relation to a longitudinal direction 17 of the transverse leaf spring 2 and to the motor vehicle Z direction. With respect to the motor vehicle Z direction, the underside 8 points downwards. The opening 11 of each of the mounts 50 on the opposite ends 4 of the leaf spring 4 can be used for receiving a bearing, in particular a metallic bearing, or a screw bolt, for example.

As shown in FIG. 2b, the mount 50 is provided with a support shoulder 16 which embraces, at least in part, an end face 12 of the transverse leaf spring 20 so that the support shoulder 16 form fittingly rests against the end face 12. Advantageously, the support shoulder 16 is bonded by an adhesive to the end face 12 of the transverse leaf spring 20. The support shoulder 16 provides a self-centering function with respect to the longitudinal direction 17 of the transverse leaf spring 20, when the mount 50 is connected to the transverse leaf spring 20. During later operation, the transverse leaf spring 20 undergoes a deflection in motor vehicle Z direction which coincides with a change in length in the longitudinal direction 17 of the transverse leaf spring 20. The applied forces during changes in length in compressive direction are then additionally compensated by the support shoulder 16, and the applied forces during changes in length in tensile direction are compensated by the bond between the end face 12 of the transverse leaf spring 20 and the support shoulder 16.

Advantageously, the support shoulder 16 rests form fittingly against only part of the end face 12. In particular, the support shoulder 16 covers 10% to 80%, preferably 20% to 60% of the overall area of the end face 12. Currently preferred is a coverage of 25% to 50%. Advantageously, the end 4 of the transverse leaf spring 20 is not fully encased by the mount 50, and the mount 50 does not embrace the end 4 of the transverse leaf spring 20 in its entirety so that the mount 50 rests only against the underside 8 and in part against the end face 12. The adjacent surfaces are advantageously bonded to one another. Also, the mount 50 is sized such that no sides of the transverse leaf spring 20 are embraced.

Adhesive is advantageously applied also between the mount 50 and the end face 12. This results in a self-centering of the mount 50 upon the transverse leaf spring 20 and additional stability in motor vehicle Y direction.

FIGS. 3a and 3b show installation scenarios of the leaf spring arrangement 100 according to the invention. In FIG. 3a, the end 4 of the transverse leaf spring 20 is coupled with the mount 50 and in kinematic connection with an upper control arm 14, e.g. a transverse control arm, via a tie rod 13. A force F, exerted by the control arm 14, is primarily transmitted upwards through the tie rod, as viewed in the drawing, and causes a compression in the bonded joining surface 10 between the end 4 of the transverse leaf spring 20 and the mount 50. Stress for both static and dynamic wheel loads mainly occurs in direction of action of the force F so that the tie rod 13 predominantly transmits a depicted tensile load, causing a compression in the joining surface 10.

FIG. 3b shows an arrangement with a lower control arm 14, e.g. transverse control arm, which is coupled by a pressure bar 15. Thus, a force F is applied via the control arm 14 predominantly in pressing direction of the pressure bar 15, causing again a compression in the joining surface 10. Also in this case, the primary force introduction by both static and dynamic wheel loads is established in pressing direction of the pressure bar so that the bond provides sufficient strength and durability between the transverse leaf spring 20 and the mount 50 and is easy to implement.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A leaf spring arrangement for a motor vehicle axle, comprising:
   a leaf spring made of a fiber composite and having ends, each end having a flat underside to provide a joining surface;

mounts for attachment onto an axle component, said mounts being bonded by an adhesive flatly against the underside of the ends of the leaf spring in an area of the joining surface, each said mount having an opening for receiving a metallic bearing or screw bolt; and a tie rod or pressure bar coupled to the mount to exert a force from the mount in a direction of the end of the leaf spring, wherein the mount is configured to embrace, at least in part, an end face of the leaf spring, wherein the mount includes a joining surface and a support shoulder, said support shoulder being configured to extend beyond the joining surface of the mount with respect to a vertical motor vehicle direction, said support shoulder resting against the end face of the leaf spring, and wherein the mount is arranged below the joining surface and thereby also the opening is arranged below the joining surface as viewed in a motor vehicle Z direction.

2. The leaf spring arrangement of claim 1, wherein the leaf spring is made of a fiberglass composite.

3. The leaf spring arrangement of claim 1, wherein the leaf spring is made of several layers of fiber composite.

4. The leaf spring arrangement of claim 1, wherein the opening of the mount extends in substantial orthogonal relation to the joining surface.

5. The leaf spring arrangement of claim 1, wherein the mount is made of a metallic material.

6. The leaf spring arrangement of claim 1, wherein the leaf spring is configured as a transverse leaf spring.

7. The leaf spring arrangement of claim 1, wherein the support shoulder has a contact surface which is bonded with the end face of the leaf spring.

8. The leaf spring arrangement of claim 1, wherein the support shoulder covers 10% to 80% of an overall area of the end face.

9. The leaf spring arrangement of claim 1, wherein the support shoulder covers 20% to 60% of an overall area of the end face.

10. The leaf spring arrangement of claim 1, wherein the support shoulder covers 25% to 50% of an overall area of the end face.

\* \* \* \* \*